July 18, 1939.  H. J. SCHUH ET AL  2,166,880

SPRINGING ARRANGEMENT FOR VEHICLES

Filed March 18, 1937   2 Sheets-Sheet 1

Inventor

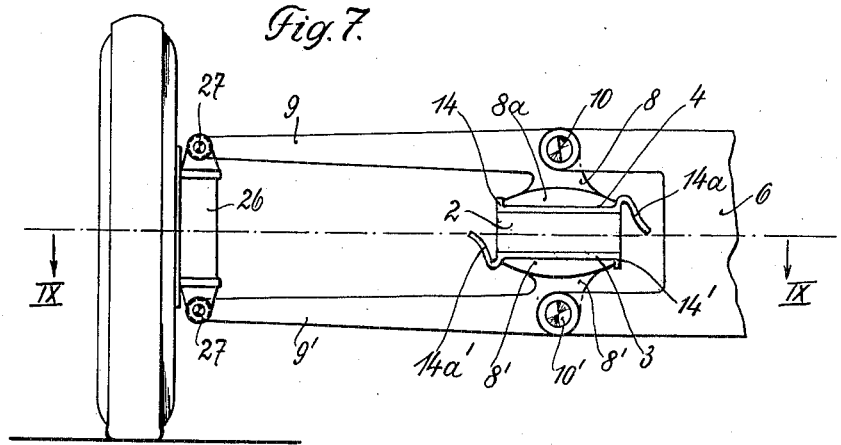
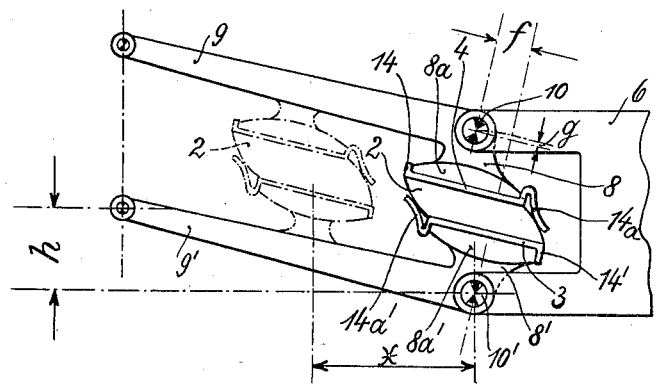
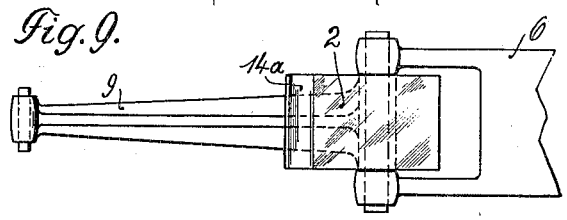

Patented July 18, 1939

2,166,880

UNITED STATES PATENT OFFICE 2,166,880

SPRINGING ARRANGEMENT FOR VEHICLES

Heinrich Jakob Schuh, Zwickau, and Walter Boxan, Chemnitz, Germany, assignors to Auto Union Aktiengesellschaft, Chemnitz, Germany Application March 18, 1937, Serial No. 131,720
In Germany March 16, 1936

2 Claims. (Cl. 267—21)

The invention relates to a springing arrangement, more particularly for automobiles with independent wheels, using rubber members stressed in shear and adhering between two plates.

Springing arrangements of this kind are already known in which one adhering plate is secured to the guiding link and the other to the frame. In this case only one plate takes part in the swinging movement of the link, while the other rests in the frame. The hardness of springing of the rubber member depends upon the ratio of transmission between the swinging plate and the swinging wheel. Since, however, in view of the constructional length of this plate the ratio of transmission cannot be made high enough, it becomes necessary to employ comparatively soft rubber members. This, however, is undesired, because soft rubber members require much space and have much too little natural damping.

In contradistinction thereto the novelty of the invention consists in this, that the two plates are secured on links and are displaced relative to one another while the wheel moves. In this case, both plates swing with mutual displacement in the direction of shear, so that the transmission ratio between the deflection of the wheel and the deformation of the rubber member can be freely chosen. It is thus possible to use very hard rubber members of great length and small breadth—which require only little space and have great natural damping. This springing arrangement is independent of the construction of the frame and can be removed together with the wheel guiding means; the use of a separate shock absorber or a device for protection against breakage is unnecessary; it is absolutely reliable, even when not given any attention.

Several constructional examples of the invention are illustrated in the accompanying drawings:

Fig. 7 is an elevation of the springing arrangement for a further link quadrilateral swinging across the direction of travel;

Fig. 8 is a corresponding elevation in the uppermost position of the wheel and

Fig. 9 is a section on the line IX—IX in Fig. 7.

Figure 1:
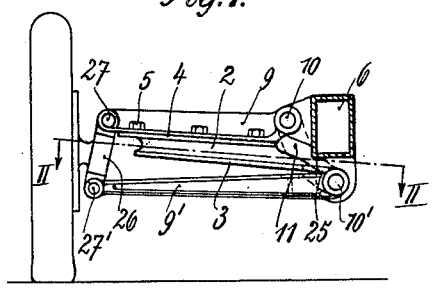
Fig. 1 is an elevation of the springing arrangement for a link quadrilateral swinging transversely to the direction of travel.
Figure 2:
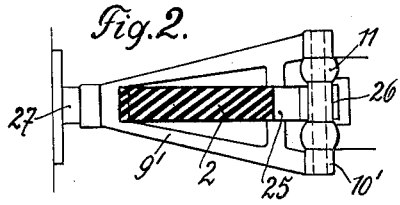
Fig. 2 is a section on the line II—II of Fig. 1.

In the constructional example according to Figs. 1 and 2 the wheel is guided approximately parallel to itself by two superposed links 9, 9'. The lower guiding link 9' is constructed as a triangular lever and is mounted in a bracket 11 by means of the journal 10'. The upper guiding link 9 is constructed as a simple lever and is mounted in the same bracket 11 by means of the journal 10. The ends nearer to the wheel of the links 9, 9' are connected in a known manner to the stub axle carrier 26. The bracket 11 is secured in a suitable manner to the longitudinal frame member 6. On the journal 10' is rotatably mounted a springing link 25, which extends towards the wheel approximately parallel to the guiding link 9. The adhering plates 3, 4 of the rubber member 2 are secured respectively to the springing link 25 and the guiding link 9. The plate 3 itself forms the link 25, while the plate 4 is secured to the link 9 by screw bolts 5.

Figure 3:
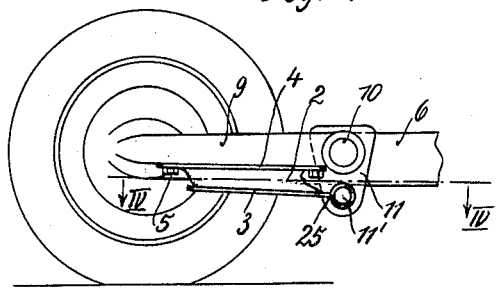
Fig. 3 is an elevation of the springing arrangement for a single link swinging in the direction of travel.
Figure 4:
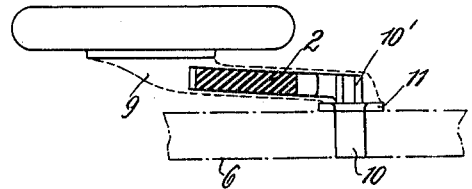
Fig. 4 is a section on the line IV—IV in Fig. 3.

In the constructional example according to Figs. 3 and 4 the wheel is guided parallel to itself by means of a link 9 swinging in the direction of travel, which is mounted by means of a journal 10 in the bracket 11. Beneath the link 9 a springing link 25 is mounted in the bracket 11 by means of the journal 10'. This springing link extends towards the wheel approximately parallel to the link 9. The plates 3, 4 of the rubber member 2 are secured to the link 25 and the link 9 respectively. In this case also the plate 3 and the link 25 are made integral, while the plate 4 is secured to the link 9 by screw bolts 5. The bracket 11 is secured to the longitudinal frame member 6 in a suitable manner.

Figure 5:
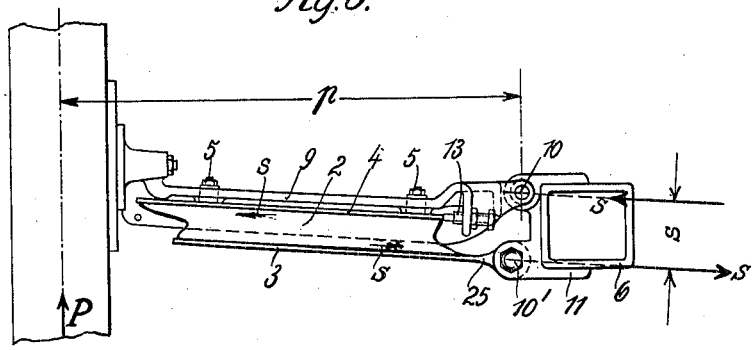
Fig. 5 is a vertical principal section through the spring arrangement for a swinging half axle.
Figure 6:
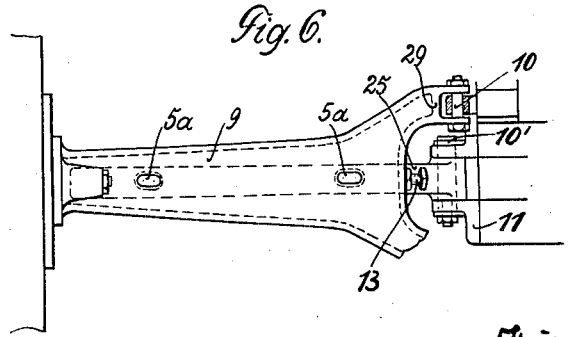
Fig. 6 is a corresponding plan view.

In the constructional example according to Figs. 5 and 6 the wheel is guided by means of a swinging half axle 9 of which the end 29, nearer to the frame, is forked and is mounted in a bracket 11 by means of two journals 10. The link 25 extends beneath the half axle 9 and approximately parallel thereto towards the wheel. It is rotatably mounted in the bracket 11 by means of the journal 10'. The journal 10', as seen in plan, lies between the journals 10 and is arranged coaxially therewith. The link 25 is itself constructed as the adhering plate 3 of the rubber member 2. The plate 4 of the rubber member 2 is secured to the half axle 9 by means of screw bolts 5 which rest in longitudinal holes 5a of the half axle. The half axle 9 is constructed in the shape of a channel and partly encloses the rubber member 2, so that the latter is not seen from the outside. The plate 4 is adjustable by means of a pressure screw in the half axle 9.

If the wheel swings under the force P the link 25 is positively driven by the rubber member 2, the plate 4 becomes displaced with respect to the plate 3 and stresses the rubber member 2 substantially in shear. The moment P.p is balanced by the spring moment S.s. The wheel deflection is only small compared with the spring displacement, so that hard rubber members can be used. If the springing arrangement requires to be adjusted so as to obtain a definite axle position, it is only necessary, as in the constructional example in Fig. 5, for the screw bolts 5 in the longitudinal holes 5a to be loosened somewhat and for the pressure screw 13 to be moved in the desired direction.

These constructions of the springing arrangement require very little space and practically no attention. Journals 10, 10', which preferably lie closely side by side, can be mounted in a common bracket and lubricated together. The journals 10, 10' may, however, also be mounted by means of rubber bushes, which damp any shocks which may occur and make lubrication unnecessary. Separate means for damping the springing arrangement for securing it in case of breakage of a link are unnecessary, since the rubber member 2 itself acts as a damping and securing member.

In the constructional example according to Figs. 7 to 9 the wheel is guided parallel to the frame by means of two superposed links 9, 9'. The guiding links 9, 9' are mounted at the frame side in a frame member 6 by means of journals 10, 10' and on the wheel side by means of journals 27 in the stub axle carrier 26. The ends of the links nearer the frame are provided with oppositely directed extensions 8, 8' which are widened to form plates 8a, 8a'. The plates 3, 4 of the rubber member 2 are secured to the link plates 8a, 8a'; they embrace the latter on both sides with abutments 14 in the direction of shear. Each of these abutments on the left below, and on the right above, is provided with resilient extensions 14a, 14a', which bear against the rubber member 2 for restricting the wheel movement h. The rubber member 2 is preferably placed between the link plates 8a, 8a' with a small compression, in order to prevent it falling out.

The wheel movement h is accompanied by a small spring displacement f; the rubber member 2 is stressed practically exclusively in shear. The rubber member 2 rotates together with the links 9, 9', the plates 8a, 8a', or 3, 4 being mutually displaced. In the upper end position of the links 9, 9' the movement is resiliently checked by the extensions 14a, 14a'. The spring deflection f is accompanied by a small transverse deflection g which somewhat increases the compression of the rubber member and makes the springing harder towards the end positions.

It is immaterial for the invention at what part of the links 9, 9' the oppositely directed extensions 8 are formed, since the geometrical conditions are the same, more especially for equally long and similarly directed links 9, 9'. According to the purpose for which it is intended, the rubber member 2 can be arranged at any distance x from the journals 10, 10', as shown in Fig. 8. Also a number of rubber members 2 can be arranged side by side, in order to increase the spring effect with small dimensions.

What we claim is:

1. A springing arrangement for an independently sprung vehicle wheel comprising in combination with the vehicle frame, two rotatably mounted links carried by the frame for guiding the wheel, a pair of plate members, one of said plates being secured to each link, said plates being adapted to move in the swinging plane of the wheel, a relatively hard rubber member interposed between and secured to the surfaces of said plate members whereby the shear resistance of the rubber member opposes the springing of the wheel.

2. A springing arrangement for an independently sprung vehicle wheel comprising in combination with the vehicle frame, two rotatably mounted links carried by the frame for guiding the wheel, a pair of plate members, one of said plates being secured to each link, said plates being adapted to move in the swinging plane of the wheel, a relatively hard rubber member interposed between and secured to the surfaces of said plate members whereby the shear resistance of the rubber member opposes the springing of the wheel, and said plates being provided with extensions which bear against the ends of the rubber member for limiting the wheel deflection.

HEINRICH JAKOB SCHUH.
WALTER BOXAN.